US007162916B2

(12) United States Patent
Zavarehi et al.

(10) Patent No.: US 7,162,916 B2

(45) Date of Patent: Jan. 16, 2007

(54) METHOD AND SYSTEM FOR DETERMINING ENGINE CYLINDER POWER LEVEL DEVIATION FROM NORMAL

(75) Inventors: Masoud K. Zavarehi, Corvallis, OR (US); Yang Liu, Dunlap, IL (US); Conrad G. Grembowicz, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 3 days.

(21) Appl. No.: 10/848,310

(22) Filed: May 18, 2004

(65) Prior Publication Data

US 2005/0257604 A1 Nov. 24, 2005

(51) Int. Cl.
*G01M 15/00* (2006.01)

(52) U.S. Cl. ........................ 73/116; 73/117.2; 73/117.3; 73/118.1

(58) Field of Classification Search .................. 73/112, 73/115, 116, 117, 117.2, 117.3; 701/101
See application file for complete search history.

(56) References Cited

U.S. PATENT DOCUMENTS 4,627,275 A * 12/1986 Henein et al. ................ 73/112
5,686,672 A * 11/1997 Klauber et al. ........ 73/862.191
5,770,796 A * 6/1998 Sakamoto et al. ........ 73/119 A
5,878,366 A 3/1999 Schricker et al.
6,067,498 A * 5/2000 Akiyama .................... 710/110
6,082,187 A 7/2000 Schricker et al.
6,112,149 A * 8/2000 Varady et al. .............. 701/111
6,199,007 B1 3/2001 Zavarehi et al.
6,234,010 B1 5/2001 Zavarehi et al.
6,408,242 B1 * 6/2002 Tozzi ......................... 701/114
6,968,268 B1 * 11/2005 Yamada et al. ............. 701/111

* cited by examiner

*Primary Examiner*—Michael Cygan
*Assistant Examiner*—Freddie Kirkland, III
(74) *Attorney, Agent, or Firm*—Liell & McNeil

(57) ABSTRACT

Individual cylinder output deviations from a normal operating engine cylinder are detected via an analysis of crank shaft speed fluctuations. In the detection phase, the engine is operated at a steady state low idle condition, and engine speed data is collected over a plurality of engine cycles. This data is then averaged, filtered and compared to expected engine speed data. A substantial deviation from the expected speed data in the region of crank shaft angles associated with an individual cylinder during its power stroke adjacent its top dead center position indicates a power level deviation in that cylinder. The magnitude of the power level deviation can then be assessed through a similar procedure where engine speed data is collected, averaged, filtered and compared to expected engine speed data when the engine is operating in a steady state rated condition.

14 Claims, 7 Drawing Sheets

METHOD AND SYSTEM FOR DETERMINING ENGINE CYLINDER POWER LEVEL DEVIATION FROM NORMAL

TECHNICAL FIELD

The present disclosure relates generally to determining cylinder power level deviations from normal in an internal combustion engine, and more particularly to a system and method that utilizes a comparison between sensed and expected engine speeds at particular crank angles.

BACKGROUND

Too high or too low cylinder power has been a leading cause of real and perceived internal combustion engine problems. When these problems go undetected and/or unremedied, the abnormal performance can undermine the productivity or reliability of an associated work machine, vehicle, generator set, or the like. In addition, power deviations from normal can reduce fuel economy and increase undesirable emissions, such as particulates, $NO_x$ and unburned hydrocarbons. In addition, power deviations from normal also have a potential for catastrophic engine failure. Cylinder low or over power problems can also produce engine vibrations and power imbalances that can lead to customer complaints, undermine customer perceptions, and potentially increase warranty costs. Unfortunately, though cylinder power problems are common, those skilled in the art will recognize that it is often very difficult and time consuming to identify and troubleshoot cylinder power problems, especially in engines having many cylinders.

Co-owned U.S. Pat. Nos. 5,878,366, 6,082,187 and 6,199,007 addressed similar issues regarding detecting cylinder power loss in an internal combustion engine. Although the systems and methodologies described in these patents are sound, they appear to be relatively difficult to implement due to their substantial complexity and resulting costs. In other words, the methods described in these references can require substantial processing power or computational time, which may not be available in many current and planned engine systems. Because power problems are common, it is desirable to have a method for monitoring cylinder power that is compatible or integral with existing engines without adding unnecessary cost or complexity. Thus, there remains a need for an easily implemented system and method for detecting cylinder powered deviations from normal in an internal combustion engine.

The present disclosure is directed toward overcoming one or more of the problems set forth above.

SUMMARY OF THE DISCLOSURE

In one aspect, a method of determining a cylinder power deviation from normal in an internal combustion engine includes determining an engine rotational speed at a particular crank angle when a cylinder piston is adjacent a Top Dead Center (TDC) position in its power stroke. The sensed rotational speed is compared to an expected rotational speed. A cylinder power level fault is indicated if the sensed rotational speed differs from the expected rotational speed by a magnitude greater than a predetermined threshold.

In another aspect, a system determines cylinder power deviation from normal in an internal combustion engine. A means, including a sensor, is used for determining engine rotational speed when a cylinder piston is adjacent a top dead center (TDC) position in its power stroke. Another means, which includes an electronic data processor, is used for comparing a sensed rotational speed to an expected rotational speed. Finally, another means, which includes the electronic data processor, is used for indicating a cylinder power level fault if the sensed rotational speed differs from the expected rotational speed by a magnitude greater than a predetermined threshold.

In still another aspect, an article includes at least one computer readable data storage medium. An engine cylinder power level fault determination algorithm is recorded on the medium. Expected rotational speed data for an engine cycle at a predetermined operating condition is stored on the medium. The fault determination algorithm includes a speed comparison algorithm that compares a sensed engine speed to an expected engine speed.

DETAILED DESCRIPTION

Figure 1:
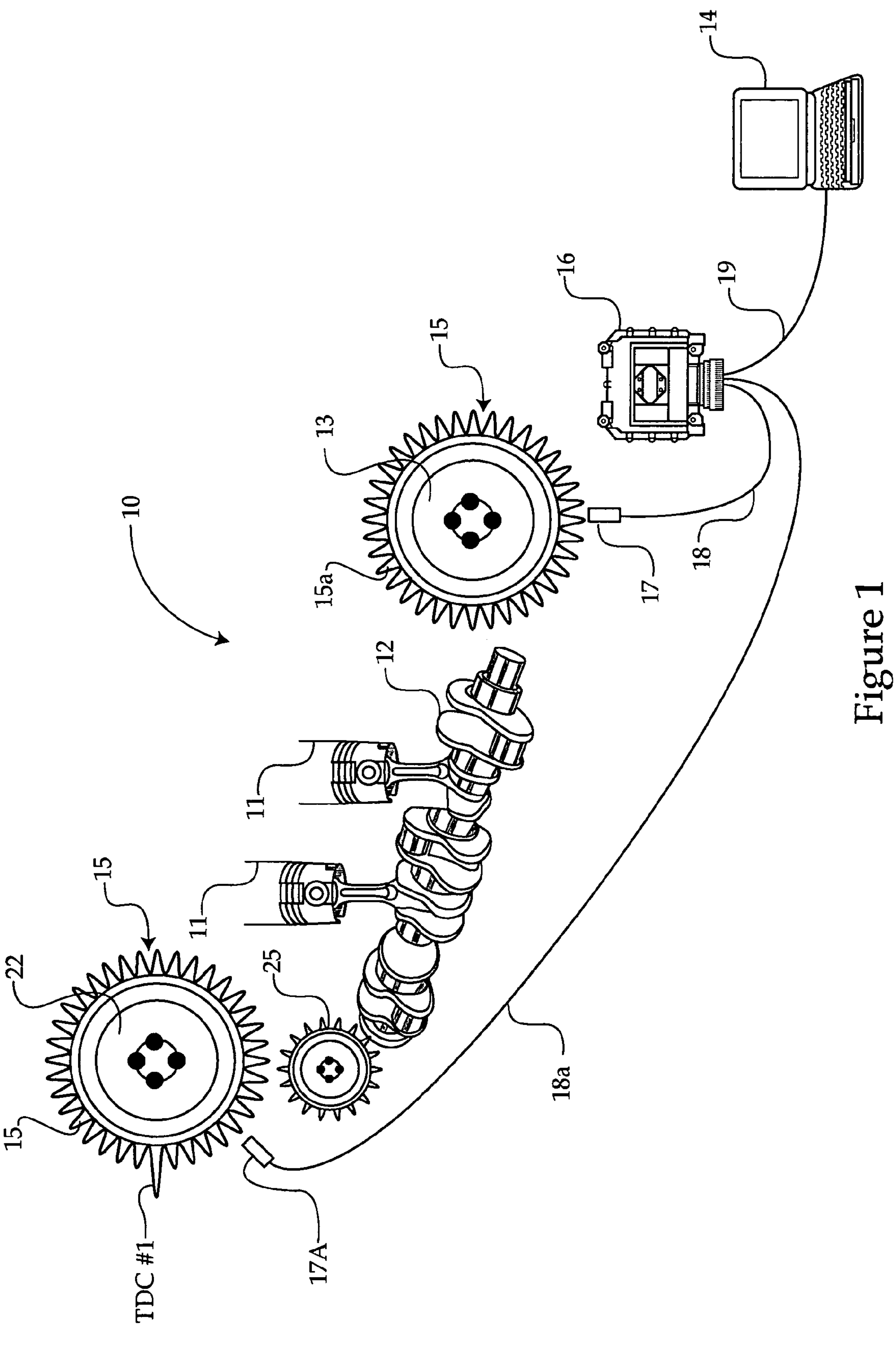
FIG. 1 is a schematic illustration of an engine according to the present disclosure operably connected to a service tool that includes a display device.

Referring now to FIG. 1, an engine 10 includes a plurality of piston operating in cylinders 11 that are coupled to a rotating crank shaft 12 which also drives a camshaft gear 22 with a plurality of evenly spaced teeth 15 around its peripheral surface through coupling gears 25. All the components being typical of conventional engines. The crank shaft 12 rotates a fly wheel 13 that includes a plurality of evenly spaced teeth 15*a* around its peripheral surface. Engine 10 is controlled in a conventional manner by an electronic control module 16, which receives data from a variety of sensors including a crank shaft tooth sensor 17, and a camshaft tooth sensor 17A, via a communication line 18 and 18A. In other words, as each tooth 15 or 15*a* passes sensors 17 and 17A, respectively a signal is transmitted which allows the electronic control module to calculate the tooth-to-tooth time or shaft rpm. For instance, the crank tooth sensor 17 of the present disclosure is preferably used for determining engine speed and the cam tooth sensor 17A is used to indicate the engine cycle position for proper control of engine fueling. This is determined by a special tooth on the cam gear which indicates Top Dead Center (TDC) for cylinder #1 similar to conventional engines. However, those skilled in the art will appreciate that other means of determining engine speed and cam shaft position would also be compatible with the present disclosure (such as using holes rather than teeth in the flywheel or measuring engine speed at other locations on the crankshaft or camshaft). Electronic control module 16 is shown connected to a display device, such as a conventional service tool 14, via a communication line 19 in a conventional manner. Thus the cylinder health information received by and/or produced by electronic control module 16 can be transmitted to the engine operator or service technician for proper engine operation or service.

Figure 2:
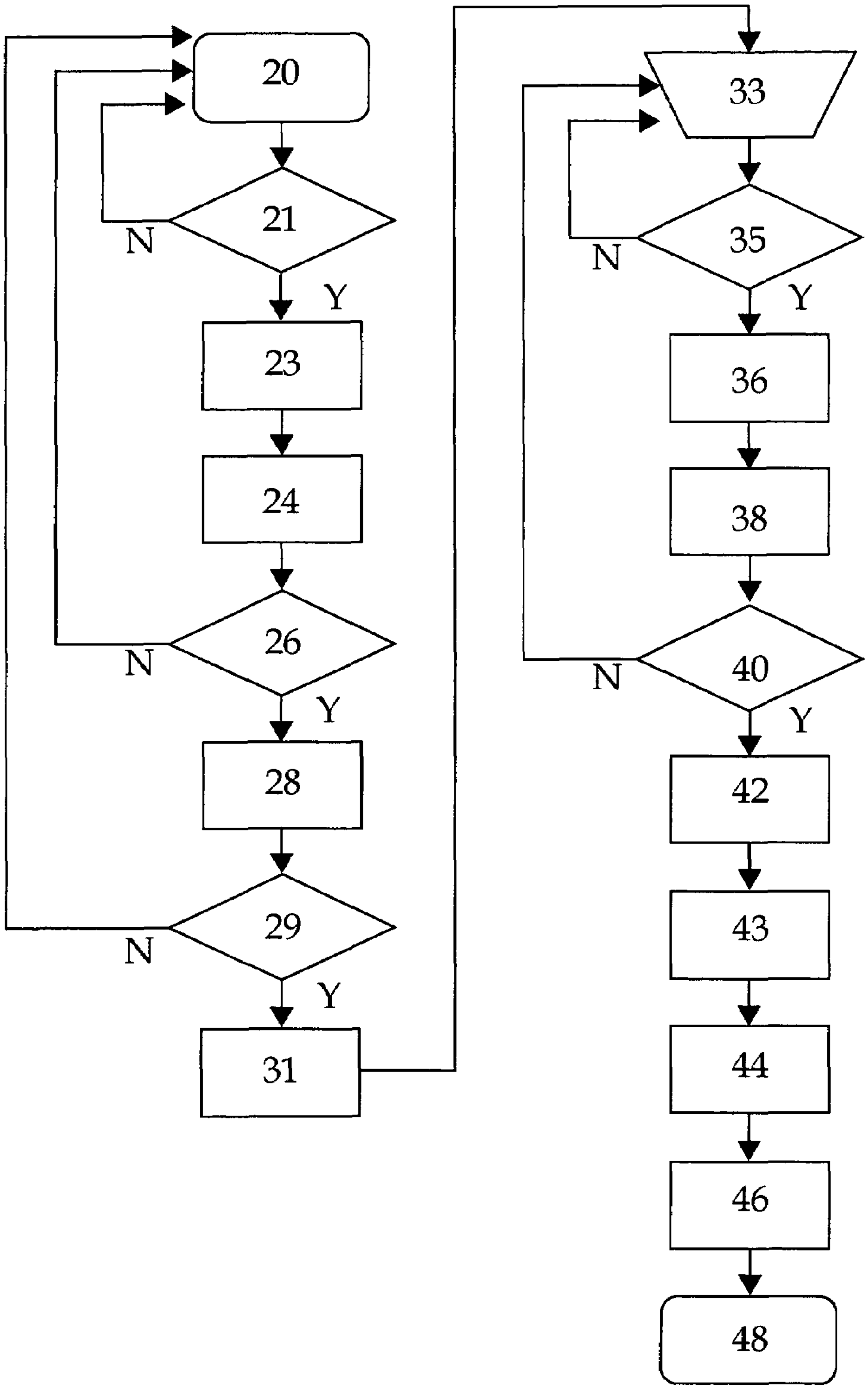
FIG. 2 is a flow diagram of software according to the present disclosure.

Referring to FIG. 2, a software flow diagram represents software that is storable on a computer readable data storage medium that is part of, or accessible to, electronic control module 16 and/or display device 14 in a conventional manner. In addition to the software programming represented by FIG. 2, other data is needed to perform the methodology of the present disclosure. Some of this data may already be stored in memory available to the electronic control module 16 or display device 14. For instance, the engine cylinder's firing order and corresponding top dead center position of each cylinder versus crank angle θ would be necessary to perform a method of the present disclosure. In other words, accurately identifying which cylinder has a power deviation from normal problem depends at least in part upon knowing the particular crank angle at which each cylinder achieves its top dead center position between its compression and power strokes. In conventional engines, this relationship is often determined by the crankshaft design and fixed for a given engine model. In addition, the present disclosure contemplates other engine data being stored on, or being available to, one or both of electronic control module 16 and service tool 14 or other display device. For instance, in the case of a four cycle engine, data corresponding to an expected engine speed fluctuation for each crank angle in the 720° engine cycle should be stored on or be available to electronic control module 16 and/or service tool 14. Preferably, this data represents an expected engine speed for a normally operating engine at a particular steady state operating condition.

Preferably, there is data corresponding to two different operating conditions in this regard. For instance, the present disclosure prefers to have expected normal engine speed data for both a low idle no load operating condition and a rated speed and load operating condition. Although the present disclosure contemplates generating expected engine speed data at a steady state operating condition (i.e. speed and load) versus crank angle in the engine's work application, this data is preferably generated previously by the engine manufacturer in a mariner well known in the art. For instance, this data can be generated through conventional testing and modeling techniques. However, those skilled in the art will appreciate that expected engine speed data versus crank angle might need adjustment relative to a particular engine application. For instance, expected engine speed data versus crank angle for the same engine in two different work machines could be different, due to such factors as different parasitic loads that exist at the chosen engine steady state operating condition. Thus, those skilled in the art will appreciate that a variety of methods are available to prepare engine speed data versus crank angle before and/or after installation in a particular machine, but it is important to the present disclosure that the data be sufficiently accurate to ascertain cylinder power deviations from normal.

Figure 3:
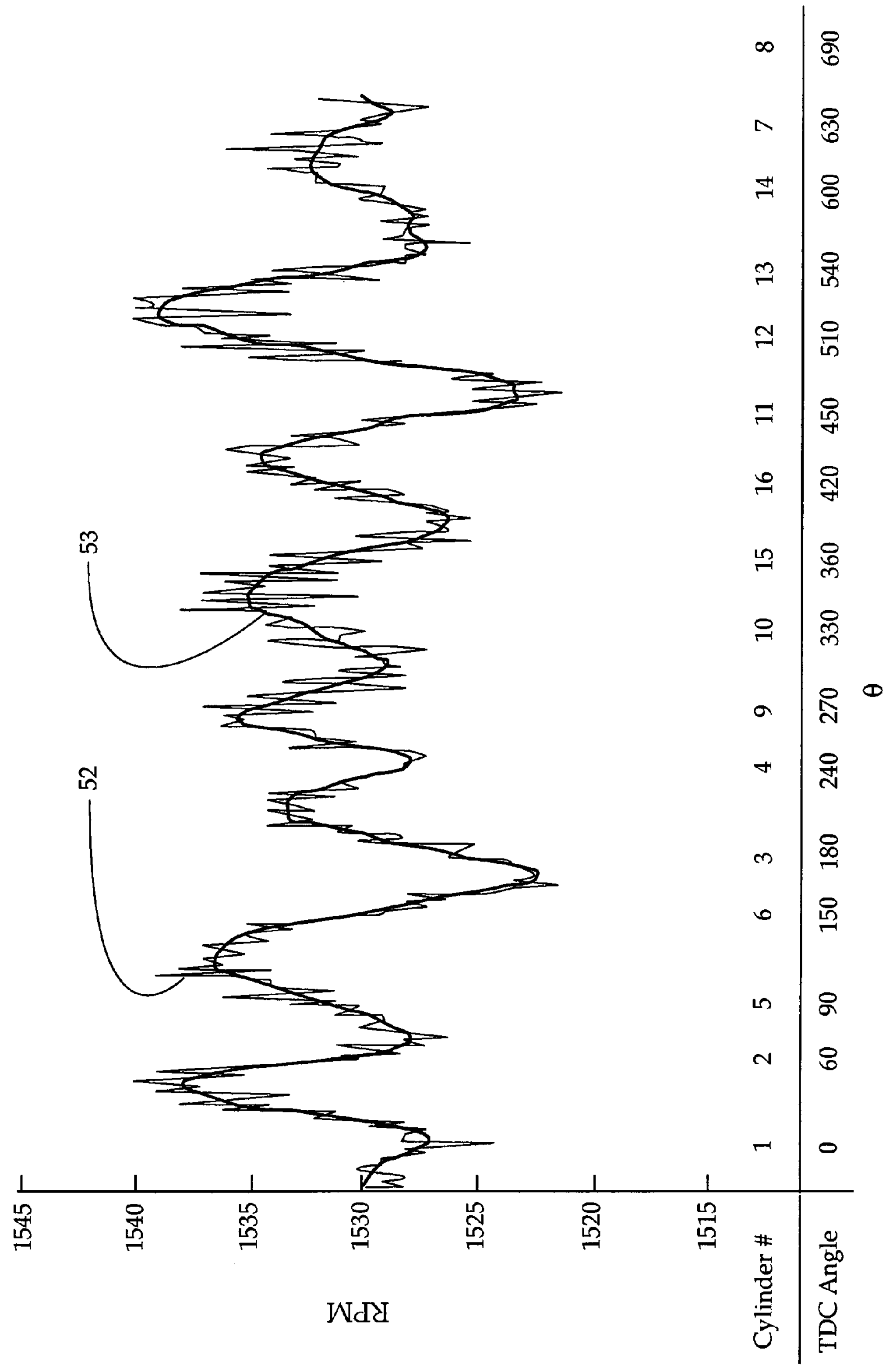
FIG. 3 is a graph of averaged and filtered engine speed fluctuations versus crank angle for a 16 cylinder diesel engine according to the present disclosure.

Referring to FIGS. 2 and 3, the methodology of the present disclosure as reflected in the software flow diagram begins at a starting point 20, which could be initiated by an operator, by a service technician or be automatically initiated by the electronic control module 16 when circumstances are appropriate. In step 21, the electronic control module 16 or service tool 14 determines whether the engine is operating at the desired operating condition, which is preferably a low idle condition. If not, the software will loop back and start over again. If there is confirmation that the engine is operating in a low idle condition, in step 23, engine speed data is collected, preferably beginning at the power stroke for cylinder #1 which is determined by cam tooth sensor 17A. Data is preferably gathered for a plurality of engine cycles. Curves 52, 53 in FIG. 3 show an example of raw engine speed data collected in step 23. In the preferred embodiment, this speed data is determined by processing time data provided by tooth sensor 17 to electronic control module 16. In other words, electronic control module 16 detects when each tooth 15A passes sensor 17 and records a time for that event. The engine speed between two adjacent teeth is then simply the difference between the two time recordings divided by the angle between those teeth, and then adjusted to reflect rotational speed (RPM). Although it possible to permit the present methodology with gathering data in a single engine cycle, the robustness of the methodology improves with gathering data from some number of engine cycles. However, those skilled in the art will appreciate that improved robustness levels off after some number of engine cycles, and thus some care should be utilized in determining the number of engine cycles necessary to accumulate quality data. It is important to note that the data from each engine cycle should be taken at identical crank angles so that the data from multiple cycles can be appropriately processed using known statistical techniques. This is automatically accomplished when using a tooth sensor as illustrated in FIG. 1 since each of the teeth 15 is associated with a particular engine crank angle, which does not change.

In order to gain meaningful information from the raw data the data from a plurality of engine cycles is preferably averaged as shown in the average curve 52 in FIG. 3. (This improves measurement accuracy without additional measurement cost.) This is preferably accomplished by taking the average of the data collected at each crank angle. However, it may be necessary for further processing since the averaged data still may have a substantial amount of high frequency noise superimposed thereon as shown in curve 52 of FIG. 3. Therefore, the averaged data is then preferably filtered through an appropriate low pass filter in order to arrive at a relatively smooth filtered curve 53 as shown in FIG. 3. For instance, a typical low pass filter used in the example of the present disclosure might be an eighth ordered butterworth low-pass filter with a 10% cut-off frequency. Those skilled in the art will appreciate that a similar methodology could be used to develop expected engine speed data in-chassis in the event that that data is not already recorded on a medium available to electronic control module 16 and/or service tool 14. Thus, step 24 represents both an averaging algorithm and a filtering algorithm. In step 26, the electronic control module determines whether the engine was operating in a steady state condition during step 23 when the data was collected. This is preferably accomplished by employing a variance algorithm that calculates a variance for the engine speed data for each crank angle over the plurality of engine cycles over which the data was collected in step 23. If the variance among in any of the data is too large, that could suggest that, for at least one of the engine cycles, the engine was not operating in a steady state condition, and therefore step 26 would re-loop back to staring step 20 to re-initialize the test in order to re-collect and store data that is generated during a steady state condition. In the event that step 26 confirms that the engine was operating in a steady state condition, the electronic control module and/or service tool 14 will advance to step 28 where the difference between the averaged filtered engine speed data 53 from FIG. 3 is compared to expected engine speed data, which reflects a normal operating engine.

Figure 4:
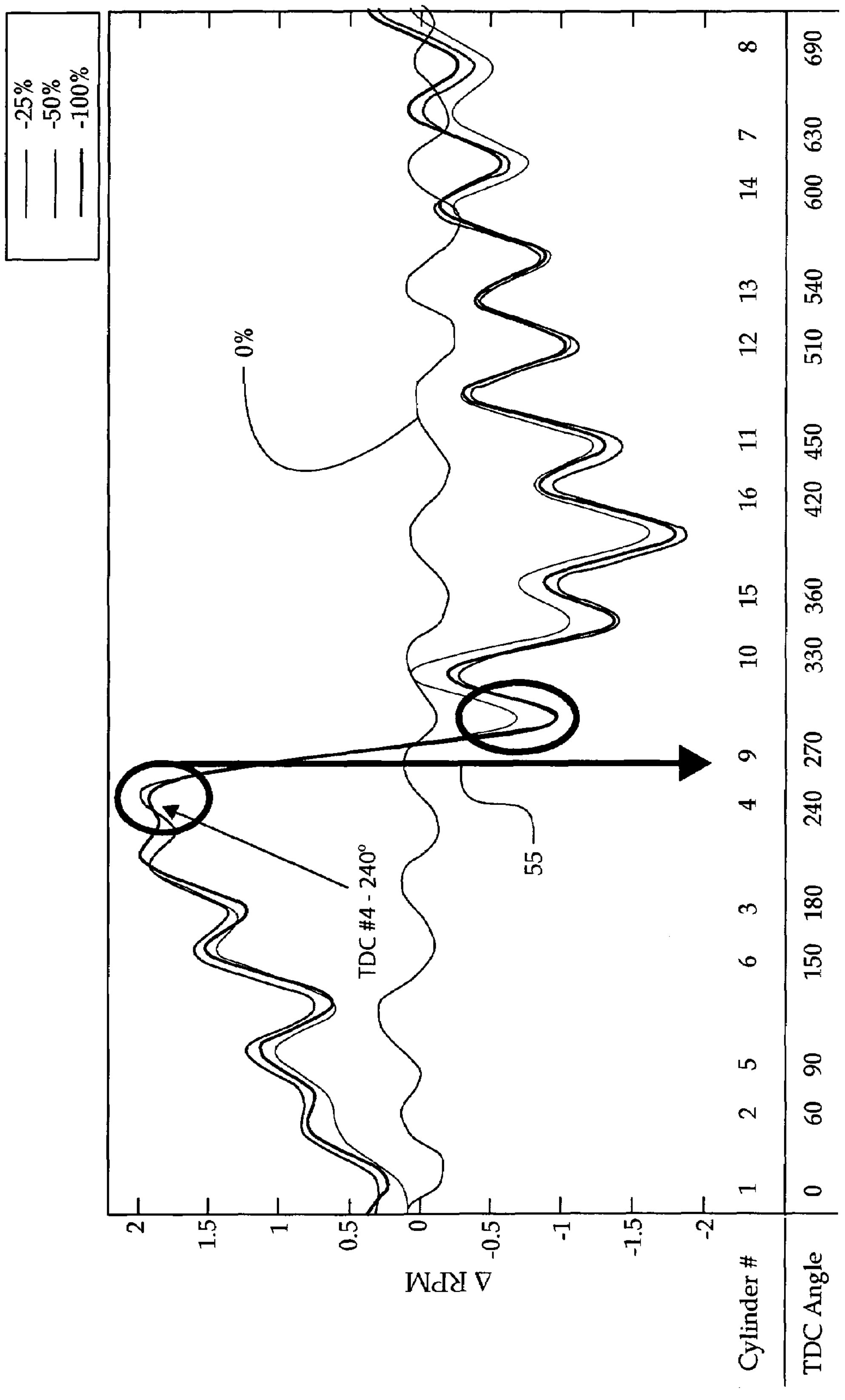
FIG. 4 is a graph of the difference between sensed and expected engine speeds versus crank angle for normal power and three example applications (25%, 50%, 100%) of low, moderate and severe cylinder power loss in cylinder 4 according to one aspect of the disclosure.
Figure 5:
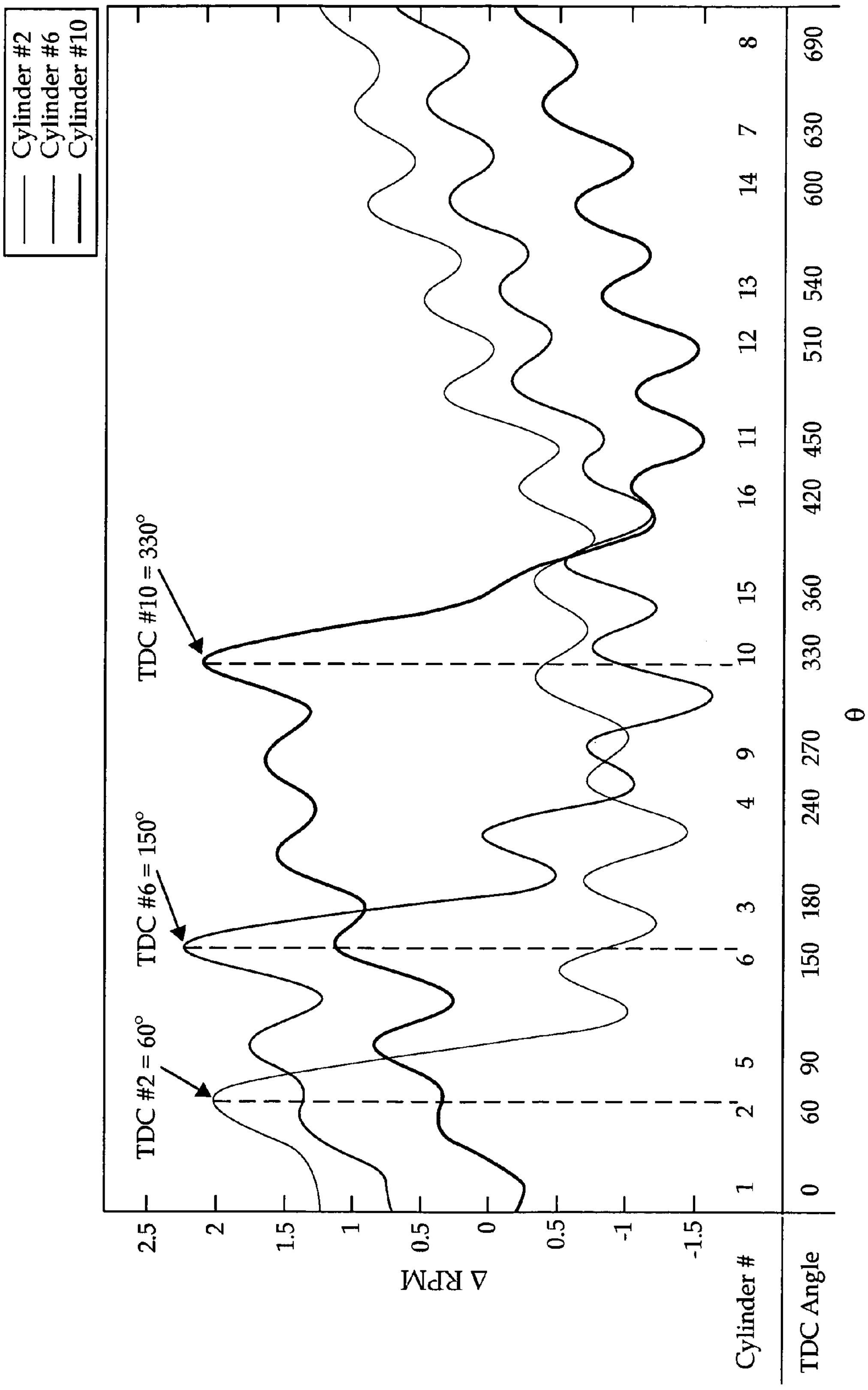
FIG. 5 is a graph of the difference between sensed and expected engine speeds versus crank angle for three examples of weak cylinders (2, 6, 10) with 100% power loss according to one aspect of the disclosure.

FIG. 4 shows the fault detection portion of the methodology, at a low idle operating condition. FIG. 4 shows an example of a comparison between averaged filtered engine speed data and expected engine speed data, as expressed by a change in RPM (Δ RPM). FIG. 4 shows four curves that reflect Δ RPM versus crank angle when cylinder 4 of a 16 cylinder engine has a 25%, 50%, and 100%, respective, power loss. A cylinder power fault is indicated when the local peak to valley RPM difference is greater than a predetermined threshold. Where this occurs in the engine cycle is dependent upon which cylinder is causing the fault. In practice, and at step 28, the electronic control module 16 and/or service tool 14 will calculate Δ RPM for each of the crank angles over one complete engine cycle. In step 29, this Δ RPM versus crank angle data is then analyzed to determine whether any of the engine cylinders has a power output that deviates from an expected or normal power output. This is accomplished by utilizing an insight according to the present disclosure that predicts that there will be a substantial change in the Δ RPM when a piston cylinder is adjacent its top dead center position in its power stroke. FIG. 4 shows there is a significant peak to valley magnitude at about the same location for each of the power loss conditions, which is slightly after TDC for cylinder #4, located at 240 degrees. Along the bottom of the graph in FIG. 4, the firing order and respective crank angle positions for each cylinder is shown. When the data is analyzed in step 29, the data processor will look for a substantial drop 55 or increase in Δ RPM in the region immediately following the TDC position for each individual cylinder. If that Δ RPM value exceeds some threshold, that cylinder will be marked or recorded as potentially having a high or low power output problem. FIG. 5 shows the speed difference waveform for three examples with different weak cylinder numbers (2, 6, 10) with 100% power loss at a low idle condition. For each example, there is a significant speed drop after the corresponding TDC for the weak cylinder: TDC #2 is 60 degrees, TDC #6 is 150 degrees, and TDC #10 is 330 degrees respectfully. As shown the method generalizes to the different cylinders in the engine.

FIG. 4 shows that during the fault detection portion of the methodology, at a low idle operating condition, there is little difference in the three power loss waveforms to distinguish power loss levels. However, the different power losses of 25%, 50%, and 100% are easily detectable via the substantial drop in the Δ RPM 55 at a crank angle range associated with cylinder #4. For instance, in the example methodology, data collection begins when engine cylinder #1 is at its top dead center position and continues for 720° until cylinder #1 is again at its top dead center position between its compression and power strokes. Thus, in step 29 if no faults are detected, the software will return to start 20. However, if a cylinder power level fault is detected, that cylinder number is identified by the substantial RPM change, and/or recorded in step 31. This data is used in another aspect of the method that goes on to qualify, and quantify, the level of power deviation of any marked cylinder from that of a normal operating engine.

In step 33, the engine is placed in another operating condition, which is preferably a rated power condition. Next, a set of steps similar to those performed at the low idle condition are performed in the rated power condition. For instance, at step 35, the electronic control module 16 and/or service tool 14 evaluate whether the engine is operating at rated power. If not, the system will return to step 33 and command or request the engine to a rated power condition. If step 35 confirms that the engine is operating in a rated power condition, engine speed data is collected in step 36 for a plurality of different crank angles for a plurality of engine cycles. In step 38, this raw engine speed data is then averaged over the number of engine cycles and then preferably filtered via a low pass filter to remove high frequency noise that may have been superimposed on the data. Next, the electronic data processor determines whether the engine was actually operating at a steady state rated condition. This is preferably accomplished by employing a variance algorithm that determines whether the variance in the engine speed data for any of the crank angles exceeds some predetermined threshold indicating that the engine was not operating at a steady state condition for the entire data collection period. If the engine was not operating in a steady state condition, the system will return to step 33 and command or request the engine to assume a rated power condition.

Figure 6:
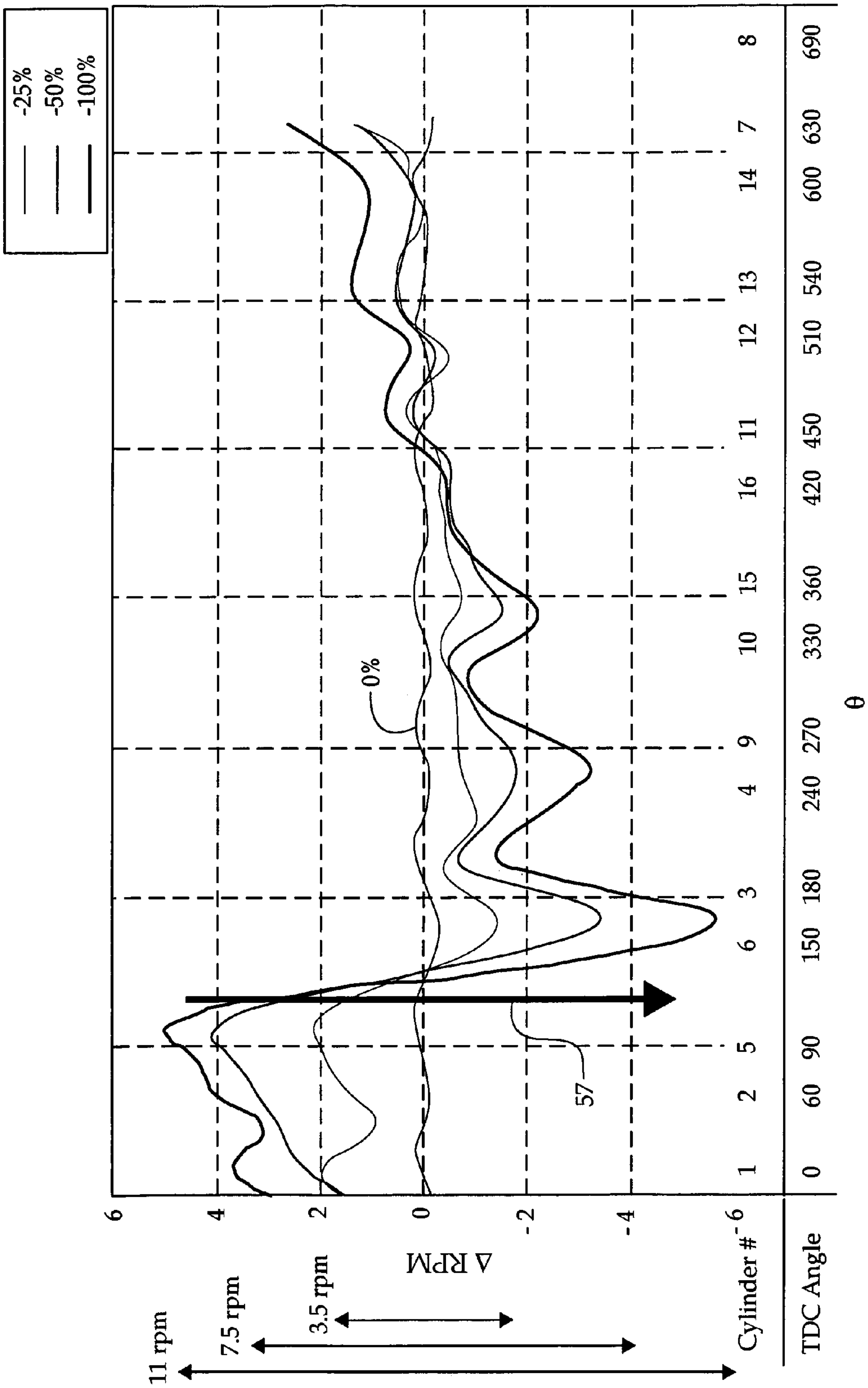
FIG. 6 is a graph of the difference between sensed and expected engine speed versus crank angle for cylinder 4 with three levels of low power (25%, 50%, 100%) during rated operation according to the present disclosure.

If step 40 confirms that the engine was operating at a steady state rated condition, the software will advance to step 42 where the electrical data processor will calculate a difference between the averaged filtered engine speed data and expected engine speed data. This should generate a curve similar to the curves shown in FIG. 6 that graph ΔRPM versus crank angle for the same engine for three levels of power loss (20%, 50%, 100%). In each instance, and as expected, there is a substantial drop in ΔRPM in the crank angle region associated with the power stroke of cylinder 45, which achieves its top dead center position at about 90°. However, there is also significant difference in the peak to valley magnitudes for the different power loss levels. Thus, a substantial change in the ΔRPM is easily detected and associated with the particular cylinder when operating at a low idle condition, but the magnitude of the power deviation is best determined when operating at a higher load condition, such as a rated condition. In the example of FIG. 6, the magnitude of the ΔRPM for the specific cylinder will correlate with the magnitude of the power loss or gain. Thus, by calibrating a particular engine, one can quantify, the power deviation from normal for that particular cylinder. This is typically accomplished in step 43 by calculating the magnitude 57 of the local peak to valley, or local minimum to local maximum in the vicinity of the marked cylinder, which in the illustrated example is cylinder 45 (see cylinder TDC location on bottom of graph). When that magnitude is compared to calibrated data in step 44, which is preferably carried by the electronic control module 16, the electronic control module 16 and/or service tool 14 can characterize the power deviation as slight, moderate or severe. In the illustrated example, slight power change would be a power change less that 25%, whereas a moderate power change would be between 25% and 75%, and a severe power deviation would be greater than 75% for that particular cylinder. This information is then stored for later retrieval or display to a service technician or used to alert the operator in some suitable manner that one or more of the engine cylinders appear to be operating with a power output that deviates from the power output that would be expected from a normal operating engine. This indication and recording aspect is performed in step 46. The software then ends at step 48.

Figure 7:
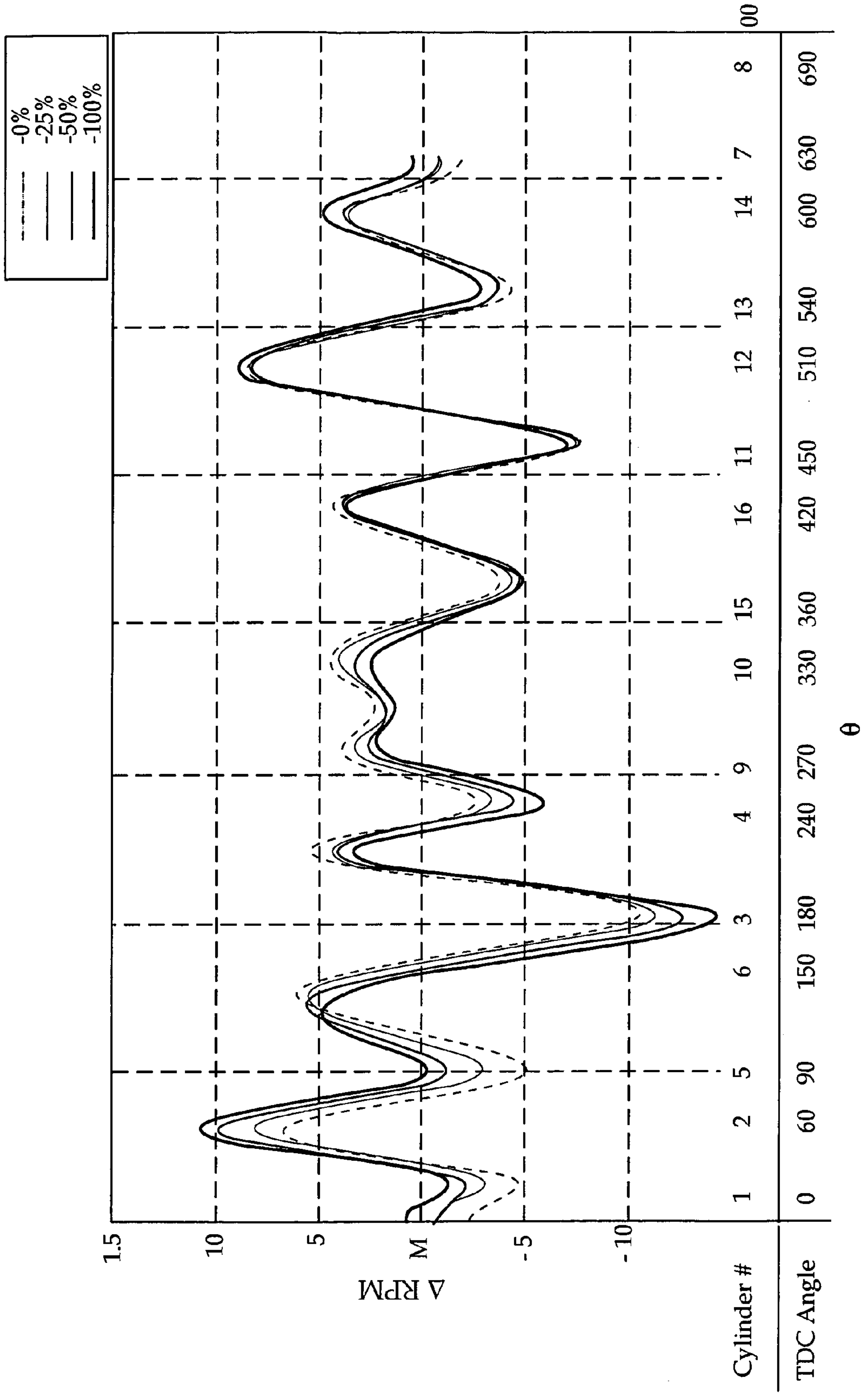
FIG. 7 is a graph of engine speeds versus crank angle for an expected, slight power loss, moderate power loss and severe power loss for a single cylinder according to another aspect of the present disclosure.

Referring now to FIG. 7, this graph is included to better illustrate just how similar the engine speed curves look with expected engine speed curve when a single cylinder, which in FIG. 7 corresponds to cylinder 5 is operating at a 25%, 50% and 100%, respective power loss. Thus, FIG. 7 is useful in helping to illustrate why it may be critical to average data over several engine cycles and filter the same in order to arrive at something resembling a smooth curve that can then be more thoroughly and accurately compared to an expected engine speed curve. This also allows less precise or costly components to be used in the system for items such as the teeth 15, the tooth sensor 17, the electronic control module 16, and the display device 14. The collected engine speed data requires sufficient precision, which is dependent upon the number of cylinders and the operating speed of the engine. In the illustrated example 151 teeth were used with a 16-cylinder engine operating at a 1600 RPM rated speed. However, those skilled in the art will appreciate that it may be possible to perform the method with only a scant amount of data and do so over a single engine cycle. For instance, if the engine were operating in a very smooth steady state condition, the data from a single engine cycle may be good enough, especially if more precise components are used as previously mentioned. In addition, by collecting data only in the region associated with a crank angle or angles of each cylinder when it is adjacent its top dead center position in its power stroke, the detection aspect, and to a lesser extent the quantification aspect of the method could be accomplished. Nevertheless, it is preferred to gather a substantial amount of data over the entire engine cycle and for a plurality of cycles in order to improve the robustness of the procedure. For instance, those skilled in the art will appreciate that if the methodology were producing false positives in detecting cylinder power level faults, it might be necessary to increase the number of engine cycles over which data is gathered. In the illustrated examples, data was collected over ten engine cycles.

Industrial Applicability

Although the method and system of the present disclosure is applicable to virtually any internal combustion engine, it finds preferred application in engines with a relatively large number of cylinders that have in the past proven difficult to detect or diagnose cylinder power level problems. While the disclosure has been illustrated in the context of a 16 cylinder compression ignition engine, the methodology should be scaleable across engine lines and also be potentially applicable to spark ignition engines as well. Those skilled in the art will appreciate that the method and software of the present disclosure is implemented in a manner well known in the art. For instance, the software corresponding to the flow diagram of FIG. 2 can be loaded or programmed into the engine or application electronic control module 16 if the testing is to be performed in-chassis, and/or the software could be programmed into the service tool 14 for conducting the power level diagnostic tests according to the method when the engine 10 is at a service location. Although the method is preferably implemented by incorporating both a power level fault detection algorithm and a power level qualification or characterization algorithm, the method could be accomplished in a reduced manner by only utilizing the software corresponding to the first column in FIG. 3, which could be considered a fault detection algorithm. However, the second column of FIG. 2 corresponds to a power level deviation characterization algorithm that is useful in assessing the magnitude of a power deviation in an individual cylinder. The magnitude of the deviation generally determines how compelling the service action should be which is information of value to customers. Nevertheless, those skilled in the art will appreciate that a method could also be implemented by only using the software associated with the second column of FIG. 2 such that the detection aspect and the qualification or power level magnitude determination aspects of the method are merged into one procedure. However, those skilled in the art will appreciate that the locations at which the power level problems can be detected are more easily detected at a low operating condition, and the magnitude of the problem is more easily assessed at a higher operating condition. Also, some types of cylinder power problems caused by fueling irregularities may appear at either the low idle or high load condition, but not both. The present invention description addresses this concern.

Those skilled in the art will appreciate that the disclosure provides a simple method and system for an internal combustion engine to estimate cylinder output power level via a simple analysis of crank shaft speed fluctuations. The method is fast and preferably uses two operating modes that are well defined and common in most engine applications. The method also uses existing components found on many presently available electronically controlled engines, some of which only require software to add the new invention. The method can also be adapted to existing mechanical engines by those skilled in the art. The method and software can accurately detect a specific low or over power cylinder, and estimate its power deviation from normal. In some instances, the electronic control module can compensate for either a low or high power cylinder in a well known manner, such as by altering fuel injector control signals for that particular cylinder in order to cause the engine to behave more like a normal operating engine. Otherwise, the methodology can be used to quickly identify which cylinder is performing differently than expected, thus suggesting that maintenance on that cylinder is needed, such as by replacing the fuel injector associated with that cylinder. Those skilled in the art will appreciate that early detection of cylinder power problems can potentially avoid catastrophic engine failure due to a power imbalance. However, those skilled in the art will also appreciate that the present methodology would also be useful in reducing perception problems in operators, improving machine performance, potentially reducing emissions, potentially improving fuel economy, and finally hastening and reducing costs associated with trouble shooting an engine exhibiting power level deviations in one or more cylinders.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A method of determining cylinder power deviation from normal in an internal combustion engine, comprising the steps of:

determining a change in engine rotational speed over a range of crank angles that correspond to when a cylinder piston is in its power stroke;

indicating a cylinder power level fault for the cylinder piston if the sensed rotational speed change is greater than a predetermined threshold;

the determining step is performed for a plurality of engine cycles in a steady state operating condition;

storing a plurality of sensed rotational speeds;

filtering out some noise from the plurality of sensed rotational speeds with a low pass filter;

determining a variance among the plurality of filtered sensed rotational speeds for different engine cycles; and reinitiating the method if the variance exceeds a predetermined threshold.

2. A method of determining cylinder power deviation from normal in an internal combustion engine, comprising the steps of:

determining a change in engine rotational speed over a range of crank angles that correspond to when a cylinder piston is in its power stroke;

indicating a cylinder power level fault for the cylinder piston if the sensed rotational speed change is greater than a predetermined threshold;

the determining step is performed for a plurality of engine cycles in a steady state operating condition;

storing a plurality of sensed rotational speeds;

filtering out some noise from the plurality of sensed rotational speeds with a low pass filter;

calculating an average filtered sensed rotational speed at a plurality of crank angles for the plurality of engine cycles; and comparing the average filtered sensed rotational speed to expected rotational speeds at each of the plurality of crank angles.

3. A method of determining cylinder power deviation from normal in an internal combustion engine, comprising the steps of:

determining a change in engine rotational speed over a range of crank angles that correspond to when a cylinder piston is in its power stroke;

indicating a cylinder power level fault for the cylinder piston if the sensed rotational speed change is greater than a predetermined threshold;

the determining step is performed for a plurality of engine cycles in a steady state low idle operating condition;

storing the plurality of sensed rotational speeds;

filtering out some noise from the plurality of sensed rotational speeds with a low pass filter;

calculating an average filtered sensed rotational speed for the plurality of engine cycles;

the comparing step is performed by comparing the average filtered sensed rotational speed to expected rotational speeds for an engine cycle;

qualifying a cylinder power deviation magnitude if the indicating step indicates a cylinder power level fault, at least in part by re-performing the determining, storing, filtering, calculating and comparing steps for a steady state rated operating condition.

4. A method of determining cylinder power deviation from normal in an internal combustion engine, comprising the steps of:

determining an engine rotational speed at a particular crank angle when a cylinder piston is adjacent a top dead center position in its power stroke;

comparing a sensed rotational speed to an expected rotational speed; and indicating a cylinder power level fault if the sensed rotational speed differs from the expected rotational speed by a magnitude greater than a predetermined threshold;

the determining step is performed for a plurality of engine cycles in a steady state low idle operating condition;

storing the plurality of sensed rotational speeds;

filtering out some noise from the plurality of sensed rotational speeds with a low pass filter;

calculating an average filtered sensed rotational speed for the plurality of engine cycles;

the comparing step is performed by comparing the average filtered sensed rotational speed to the expected rotational speed;

qualifying a cylinder power deviation if the indicating step indicates a cylinder power level fault, at least in part by re-performing the determining, storing, filtering, calculating and comparing steps for a steady state rated operating condition the qualifying step includes a step of calculating a peak to peak speed difference between a local maximum average sensed filtered rotational speed difference and a local minimum average sensed filtered rotational speed difference for a power level faulted cylinder.

5. A method of determining cylinder power deviation from normal in a compression ignition engine, comprising the steps of:

compression igniting fuel in the compression ignition engine;

storing engine speed data at respective crank angles corresponding to a cylinder piston in its power stroke, responsive to the engine being in a predetermined steady state operating condition;

determining a power deviation from normal for the cylinder responsive to a comparison of the stored engine speed data to expected engine speed data, and the determined power deviation is one of at least three different magnitudes.

6. The method of claim 5 wherein the determining step includes calculating a difference between the stored engine speed data and the expected engine speed data, at the respective crank angles.

7. The method of claim 6 wherein the determining step includes determining the power deviation responsive to a change in the calculated difference between the stored engine speed data and the expected engine speed data.

8. The method of claim 7 including a step of performing the storing step for both a predetermined loaded steady state operating condition and a predetermined unloaded steady state operating condition.

9. The method of claim 8 wherein the determining step is performed using data from the predetermined loaded steady state operating condition responsive to detection of a cylinder fault condition using data from the predetermined unloaded steady state operating condition.

10. The method of claim 6 including a step of averaging engine speed data for a plurality of engine cycles at the respective crank angles.

11. The method of claim 5 including a step of performing the storing step while a service tool is receiving data from the engine.

12. The method of claim 5 wherein the storing and determining steps are performed in-chassis.

13. The method of claim 5 wherein the storing step is performed for at least sixteen cylinders of the engine.

14. A method of determining cylinder power deviation from normal in a compression ignition engine, comprising the steps of:

storing engine speed data at respective crank angles corresponding to a cylinder piston in its power stroke, responsive to the engine being in a predetermined steady state operating condition;

determining a power deviation from normal for the cylinder responsive to a comparison of the stored engine speed data to expected engine speed data, and the determined power deviation is one of at least three different magnitudes;

wherein the determining step includes calculating a difference between the stored engine speed data and the expected engine speed data, at the respective crank angles;

averaging engine speed data for a plurality of engine cycles at the respective crank angles;

reinitiating the method responsive to a variance in the engine speed data for the plurality of engine cycles being greater than a threshold variance.

* * * * *